United States Patent [19]

Romand-Monnier et al.

[11] Patent Number: 4,536,138

[45] Date of Patent: Aug. 20, 1985

[54] MOTOR-DRIVEN PUMP ASSEMBLY WHICH CAN BE USED UNDER WATER

[75] Inventors: Jacques Romand-Monnier, Delle; Jean-Pierre Lejeune, Beaucourt, both of France

[73] Assignee: Alsthom-Atlantique, Paris, France

[21] Appl. No.: 687,232

[22] Filed: Dec. 28, 1984

Related U.S. Application Data

[63] Continuation of Ser. No. 480,611, Mar. 30, 1983, abandoned.

[30] Foreign Application Priority Data

Apr. 5, 1982 [FR] France ................................ 82 05852

[51] Int. Cl.³ .............................................. F04B 35/04
[52] U.S. Cl. ...................................... 417/422; 310/87
[58] Field of Search ................. 417/422, 424; 310/71, 310/87; 339/94 M, 94 C, 94 A, 94 R

[56] References Cited

U.S. PATENT DOCUMENTS

| | | | |
|---|---|---|---|
| 2,002,913 | 5/1935 | Mendenhall et al. | 417/424 |
| 2,233,890 | 3/1941 | Hoover | 417/422 |
| 3,711,815 | 1/1973 | Pierce et al. | 339/94 M |
| 3,736,548 | 5/1973 | Double | 310/87 |
| 3,909,644 | 9/1975 | Wieser | 310/71 |
| 3,952,218 | 4/1976 | Peters | 310/71 |
| 3,980,369 | 9/1976 | Panek | 339/94 M |
| 4,053,196 | 10/1977 | Dunaway | 310/87 |
| 4,104,484 | 8/1978 | Ijlstra et al. | 310/71 |
| 4,128,735 | 12/1978 | Zehren | 417/422 |

Primary Examiner—Carlton R. Croyle
Assistant Examiner—Donald E. Stout
Attorney, Agent, or Firm—Sughrue, Mion, Zinn, Macpeak & Seas

[57] ABSTRACT

A motor-driven pump assembly which can be used under water and includes at least an electric motor (1, 2, 3) surmounted by at least one pump (4, 5) connected to the motor drive shaft so as to rotate, wherein the motor is electrically energized by means of an electric connection module (8) fixed to the lower end of the motor (1) beyond the space taken up by the shaft, said module having a connector pin (9) connected to a cable (10) which runs along the assembly and is fixed thereto.

2 Claims, 2 Drawing Figures

FIG.1
FIG.2
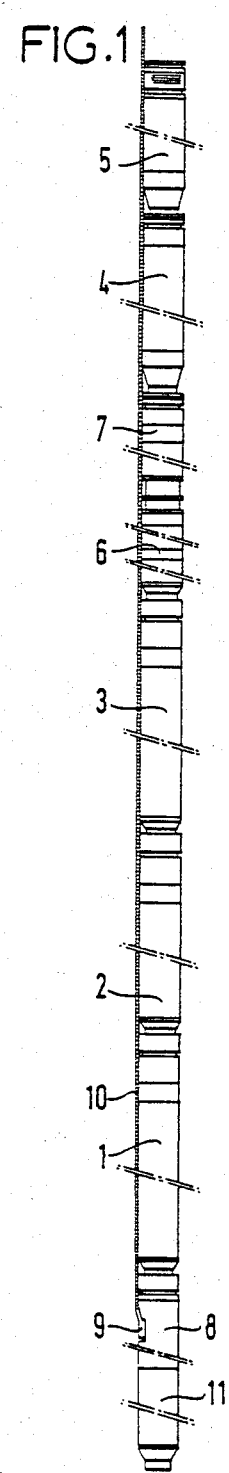
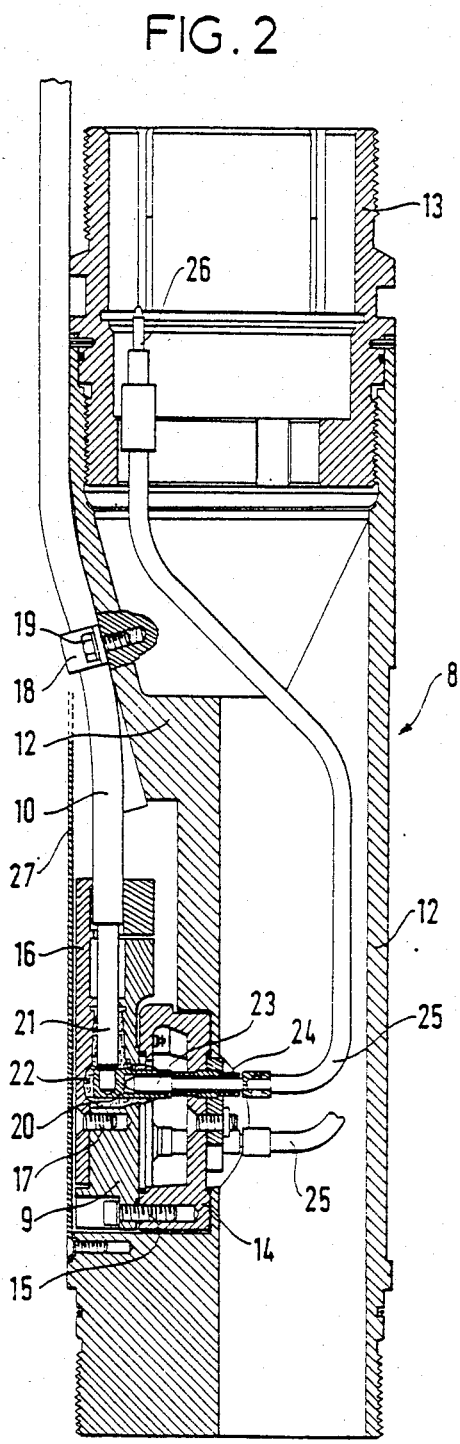

MOTOR-DRIVEN PUMP ASSEMBLY WHICH CAN BE USED UNDER WATER

This is a continuation of application Ser. No. 480,611, filed Mar. 30, 1983 now abandoned.

The present invention relates to a motor-driven pump assembly which can be used under water.

More particularly but not exclusively, the invention applies to an immersed motor-driven pump assembly submerged to a great depth and operating at a high temperature as is the case for example when pumping oil out of an oil well.

BACKGROUND OF THE INVENTION

Such an assembly has a drive unit generally consisting of several motors surmounted by pump components, a dynamic sealing system being placed between the drive unit and the pumps driven by the motors. Indeed, the motors are filled with a protective fluid while the fluid to be pumped flows through the pumps.

In known assemblies such as the one outlined above, the motors which are generally squirrel-cage, asynchronous motors are electrically energized by a connector which is always placed at the upper portion of the drive unit, between the drive unit and the sealing system and therefore at a place where the drive shaft passes through and drives the pumps. It follows that the connector must be such that it can be installed in the free space between the casing of the body and the place through which the shaft passes and hence in a small space.

Preferred embodiments of the present invention overcome said disadvantage.

SUMMARY OF THE INVENTION

The present invention provides a motor-driven pump assembly which can be used under water and includes at least an electric motor surmounted by at least one pump connected to the motor drive shaft so as to rotate, wherein the motor is electrically energized by means of an electric connection module fixed to the lower end of the motor beyond the space taken up by the shaft, said module having a connector pin connected to a cable which runs along the assembly and is fixed thereto.

The configuration in accordance with the invention thus allows improved insulation of the electrical parts from one another and relative to the earth since the shaft no longer prevents such insulation. Since the assembly is larger, it is less fragile and allows improved fixing of the cable to the connector. The larger dimensions also allow improved sealing.

BRIEF DESCRIPTION OF THE DRAWING

An embodiment of the invention is described by way of example with reference to the accompanying drawing in which:

FIG. 1 is a general view of a motor-driven pump assembly in accordance with the invention; and FIG. 2 illustrates a possible particular embodiment of an electric connection module.

MORE DETAILED DESCRIPTION

FIG. 1 illustrates a motor-driven pump assembly having three asynchronous squirrel-cage electric motors 1, 2 and 3 assembled one after another and surmounted by two pump components 4 and 5. A sealing module 6 provides sealing between the inside of each motor and the outside medium which is in communication with the inside of each pump. The module 6 is located between the motor units and the pump unit, as is a gas separation module 7.

In accordance with the invention, the motors are electrically energized by means of a connection module 8 located at the lower end of each motor beyond the end of the shaft. Said connection module has a connector pin 9 connected to a supply cable 10 which runs along the assembly and is fixed thereto.

The motor-driven pump assembly is completed by a terminal module 11 which is intended to supply oil under pressure to the motors. It has an expandable storage tank in communication with the motors and with the connection module 8 and it is subjected to the compression of springs.

FIG. 2 illustrates an embodiment of a connection module 8; it has a connector support 12 with a threaded connector 13 in its upper end for connection to the motor 1. The module 11 is screwed onto the lower end of the module 8. A connector end piece 14 is fixed onto the support 12 by means of screw, not illustrated.

The connector pin 9 connected to the supply cable 10 is fixed to the connector end piece 14 by means of three screws 15. The connector pin 9 is protected by a cover 16 fixed by screws 17. A cable clamp 18 fixes the cable 10 against the connector support 12 by means of screws 19.

The connector pin 9 carries three sockets 20 connected to three conductors 21 of the cable 10. Only one socket 20 and only one conductor 21 can be seen in the figure. The sockets 20 are embedded in an insulating substance 22.

The connector end piece 14 accomodates three male pins 23 fitted into insulators 24 and each connected to a conductor 25 which leads to an inside connector pin 26 intended to be plugged into a corresponding socket of the motor 1. The connection module 8 is connected to the motor 1 by a sleeve which screws onto the threaded connector 13.

A protective hood 27 of generally cylindrical shape covers the connector pin 9 in its socket and protects its against impacts. Said hood is connected to an inverted channel-shaped bar, not illustrated, which covers the cable 10.

We claim:

1. A submersible motor-driven pump assembly formed of axially aligned, end to end joined vertically oriented modular units for use under water, said modular units including at least one electric motor unit having an upper end and a lower end surmounted by at least one pump unit connected to the upper end of said motor unit so as to rotate the pump, the improvement wherein said end to end joined vertically oriented modular units include an electric connection module situated beneath said at least one electric motor unit coaxially aligned therewith and having an upper end detachably fixed to the lower end of the motor unit, for electrically energizing said at least one motor unit, and said electrical connection module having a connector pin connected to a cable, said cable running upwardly therefrom externally of said assembly and being fixed thereto, said connector pin being mounted within said electrical connection module, said electrical connection module further-including at least one inside connector member fixed to the upper end of said electrical connection module for effecting electrical connection at said upper end of said electrical connection module with said at least one electric motor unit at its lower end, and internal conductor means extending from said connector pin to said at least one inside connector member for supplying power from said cable to said at least one motor unit for rotating said pump.

2. The motor-driven pump assembly as claimed in claim 1, wherein said connection module comprises a connector support having an upper end and being threaded at its upper end to said motor unit, a connector end piece fixedly mounted to said connector support, at least one male pin insulatively mounted to said connector end piece being connected to a conductor internally of said connector support and forming said internal conductor means, said connector pin being fixedly mounted against said connector end piece and supporting at least one socket embedded in an insulating substance, said socket receiving said at least one male pin, and wherein said cable terminates at said connector pin and includes at least one conductor respectively connected to said at least one socket; whereby, said at least one motor unit is effectively energized electrically through the lower end of said electric motor unit via said electrical connection module with improved insulation of the electrical parts from one another relative to ground, and wherein improved fixing of the cable to the connector pin is effected.

* * * * *